US006286972B1

(12) United States Patent
Shepherd et al.

(10) Patent No.: US 6,286,972 B1
(45) **Date of Patent: *Sep. 11, 2001**

(54) BUTTON CARRIER AND DISPLAY BACKLIGHT

(75) Inventors: Mark Robert Shepherd, Basildon; Adrian Garnham, Southend-on-Sea, both of (GB)

(73) Assignee: Visteon Global Technologies, Inc., Dearborn, MI (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/292,204

(22) Filed: Apr. 15, 1999

(30) Foreign Application Priority Data

Apr. 14, 1998 (GB) .................................................. 9807702

(51) Int. Cl.[7] ..................................................... H04M 1/22
(52) U.S. Cl. .............................................. 362/86; 362/234
(58) Field of Search ................................ 362/24, 26, 27, 362/29, 30, 489, 86, 88

(56) References Cited

U.S. PATENT DOCUMENTS

| | | | | |
|---|---|---|---|---|
| 4,536,625 | * | 8/1985 | Bebie | 200/5 A |
| 4,625,263 | * | 11/1986 | Strohmeier | 362/559 |
| 4,634,818 | * | 1/1987 | Hayes-Pankhurst | 200/5 A |
| 4,638,131 | | 1/1987 | Kidd et al. | 200/61.55 |
| 4,659,183 | * | 4/1987 | Suzawa | 349/67 |
| 5,012,054 | | 4/1991 | Rada et al. | 200/314 |
| 5,127,057 | * | 6/1992 | Chapmen | 381/86 |
| 5,166,815 | | 11/1992 | Elderfield | 349/64 |
| 5,235,636 | * | 8/1993 | Takagi | 379/368 |
| 5,255,162 | * | 10/1993 | Kawamoto | 362/26 |
| 5,311,656 | * | 5/1994 | Eldershaw | 200/5 A |
| 5,397,867 | | 3/1995 | Demeo | 200/5 A |
| 5,537,300 | * | 7/1996 | Kraines | 362/31 |
| 5,596,343 | | 1/1997 | Snider | 345/102 |
| 5,655,826 | * | 8/1997 | Kouno | 362/24 |
| 5,727,866 | * | 3/1998 | Kraines | 362/31 |
| 5,920,150 | * | 7/1999 | Crary | 313/484 |
| 5,940,015 | * | 8/1999 | Thornton | 341/20 |

FOREIGN PATENT DOCUMENTS

| | | |
|---|---|---|
| 3806042 A1 | 2/1988 | (DE) . |
| 0 644 564 A1 | 3/1995 | (EP) . |
| 0 644 564 B1 | 11/1997 | (EP) . |
| 2 690 589 | 10/1993 | (FR) . |
| 2 181 283 A | 4/1987 | (GB) . |

* cited by examiner

*Primary Examiner*—Thomas M. Sember
*Assistant Examiner*—Hargobind S. Sawhney
(74) *Attorney, Agent, or Firm*—Larry I. Shelton

(57) ABSTRACT

The present invention relates to a button carrier and display backlight (5) that may be used in an electronic device such as a motor vehicle cassette radio unit. The carrier (5) comprises a button portion (4,6) and a display portion (2) integrally molded in a substantially uniform translucent plastics material. The button portion (4,6) has at least one button backlight arranged to shine through the translucent material, preferably through integrally moulded buttons (30–36). The display portion (2) has at least one backlight arranged to illuminate a display backlight area (8) by light surface-scattered from the area (8) to provide a diffuse back illumination for a display. The button portion (4,6) may have an opaque surface coating over part of the translucent material, so that the button portion (4,6) is not backlit through the coated part.

12 Claims, 2 Drawing Sheets

BUTTON CARRIER AND DISPLAY BACKLIGHT

BACKGROUND OF THE INVENTION

1. Field of the Invention

The present invention relates to a button carrier and display backlight for an electronic device, for example a button carrier and display backlight for use with an audio device such as a motor vehicle cassette radio unit.

2. Disclosure Information

Electronic devices often have a combination of user operable buttons and a display. One known way of providing such buttons is to have a plastics material button carrier, for example a moulded piece of plastic that is held in place behind a front panel or bezel. The buttons, or areas adjacent each button, may be backlit, for example being moulded in a clear plastic on which opaque or translucent paint has been applied. The backlight then is projected through the translucent paint, for example to display words, symbols or to indicate if the button is on or off.

It is often necessary to provide more than one button carrier, for example if the buttons are arranged in areas separated by the display. In one arrangement known from a motor vehicle cassette radio, a display is held on a display carrier on which light emitting diodes (LEDs) are mounted for backlighting the display; and two separate button carriers hold buttons on either side of the display carrier. Each carrier has its own printed circuit board (PCB) on which LEDs for backlighting the display or buttons.

The display may be a liquid crystal display, backlit with a convenient source of light such as an array of LEDs. A transmissive diffuser, such as frosted clear plastic material, is sometimes provided so that the light is more evenly distributed across the display. The display LEDs may be mounted on a printed circuit board, on which the display and optionally a diffuser may be clipped or otherwise held.

Therefore, it is generally necessary for a number of carriers, optical components and PCBs to be fixed, for example by means of screws, to the inner surface of the cassette radio bezel, which is in turn clipped to the cassette radio chassis. The need to have a number of separate components with associated manufacturing steps adds to the cost of the electronic device.

It would be desireable to provide a more convenient carrier arrangement in which a button portion and a display portion may be backlit.

SUMMARY OF THE INVENTION

According to the present invention, there is provided a button and display carrier, comprising a button portion and a display portion integrally moulded in a translucent plastics material, the button portion having at least one backlight arranged to shine through the translucent material, and the display portion having at least one backlight arranged to illuminate a backlight area of the translucent material, to provide a diffuse back illumination for a display, characterized in that the diffuse back illumination is provided by light incident upon and surface-scattered from the backlight area.

Preferably the composition of the translucent material is substantially uniform in both the button and display portions.

The display may be any type of display suitable for back illumination, such as a liquid crystal display.

The surface-scattered light will be mainly from light reflected and back-scattered from the surface of the backlight area. But because the material is translucent, a significant proportion of the light will penetrate the surface, for example at least half of the total incident light will not be reflected from the surface. Therefore, the term surface-scattered light also includes light back-scattered from the bulk of the translucent material, especially from the bulk closest the surface of the backlight area.

Such surface scattering provides a relatively efficient means of spreading the light from the light source, with minimum absorption and stray reflection by the translucent material, particularly if the light upon the surface of the backlight area is incident at a shallow angle over substantially most or all the area. The term shallow angle is used herein to refer to an angle within 45° of the surface at a point on the backlight area, and preferably less than about 30°. The efficiency of illumination becomes more important for larger area displays owing to the need otherwise to employ a large number of light sources to provide sufficient illumination.

Therefore, at least one backlight of the display portion may be disposed to one side of the backlight area, and illuminates the surface of the backlight area at a shallow angle. Preferably the display portion has a linear array of backlights disposed along an edge of the backlight area, the surface of the backlight area being concave in a plane perpendicular to the axis of the linear array. The concave shape may have an essentially parabolic shape, so that the illumination intensity of each unit area of the backlight area is relatively constant.

Optionally, there may be more than one button portion and/or more than one display portion. In a preferred embodiment of the invention, there are two button portions either side of a middle display portion.

The button portion may have an opaque surface coating over part of the translucent material, so that the button portion is backlit through the uncoated part. The uncoated parts may therefore display information regarding the function or status of the button, for example whether or not it has been activated by the user.

In a preferred embodiment of the invention, the button portion has at least one button integrally moulded with the carrier. For example, each button may have a linking hinge formed from integrally moulded translucent material. The linking hinge may be an integrally moulded flexure means allowing the button to flex inwards to the bezel as a user presses the button.

In order to reduce manufacturing cost, it is advantageous if the at least one backlight for the button portion and the at least one backlight for the display portion are mounted on a common circuit board held to the carrier, for example by clips or screws.

BRIEF DESCRIPTION OF THE DRAWINGS

The invention will now be further described by way of example with reference to the accompanying drawings, in which.

DETAILED DESCRIPTION OF THE PREFERRED EMBODIMENTS

Figure 1:
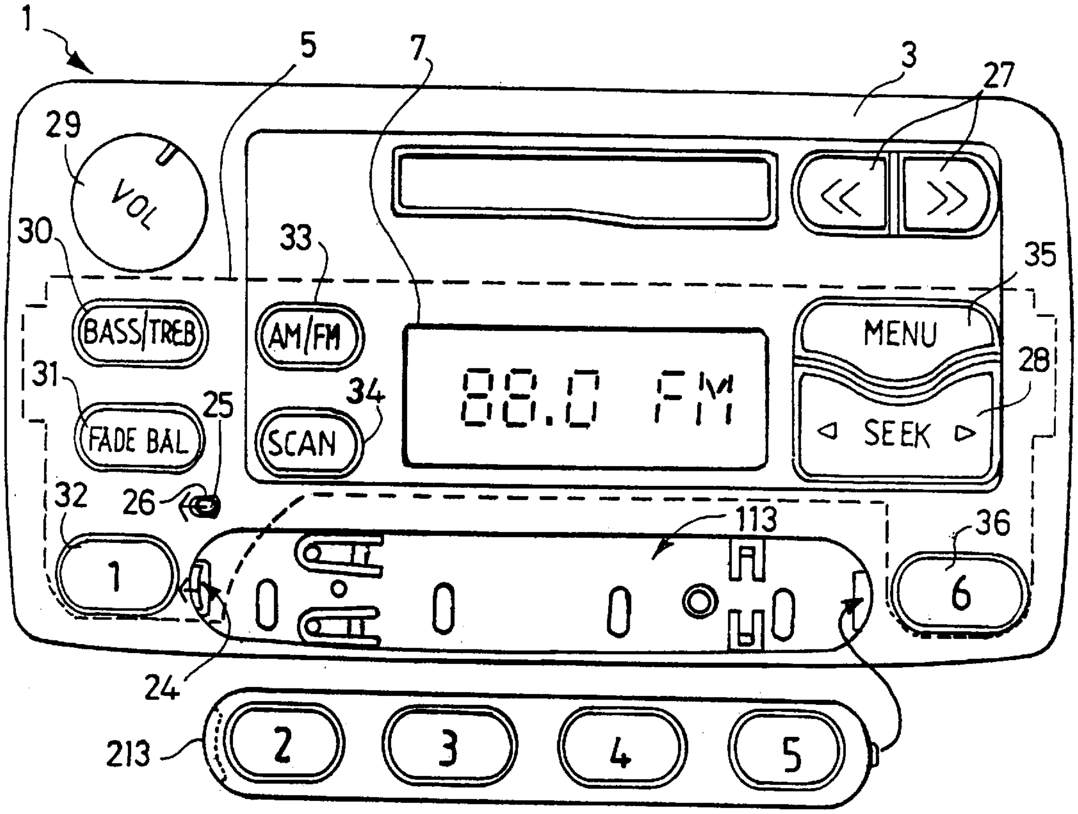
FIG. 1 is a front view of a radio cassette audio device for use in a motor vehicle passenger compartment, showing in outline an integrally moulded button and display carrier according to the invention.

FIG. 1 illustrates a bezel assembly 1 of a cassette radio audio device for use in a motor vehicle passenger compartment. The bezel assembly 1 has a fixed front panel or bezel 3 provided with various holes for a liquid crystal display 7, control buttons 27–36. For reasons of security against theft, a portion 213 of the bezel is seated within a recess 113 in the bezel and is demountable upon activation of a latch mechanism 24 via a lever arm 25 that protrudes through a small hole 26 in the bezel 3.

Although not shown, the bezel assembly 1 snaps onto the cassette radio frame in a known manner.

Figure 2:
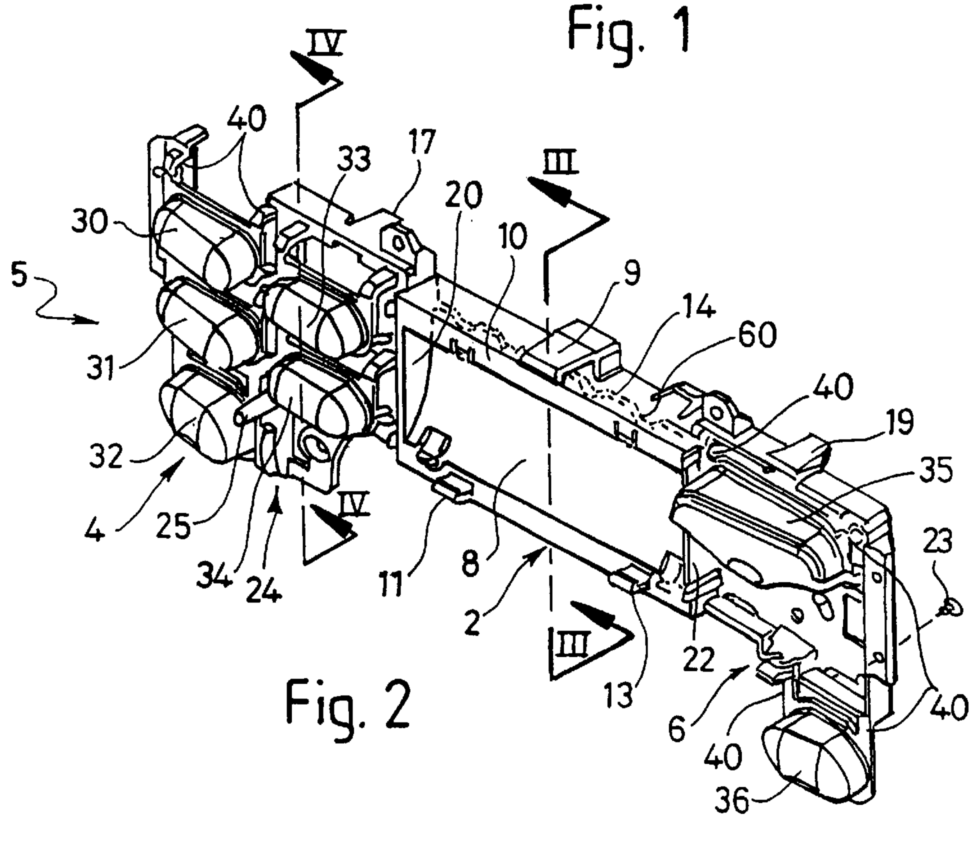
FIG. 2 is a perspective view of the button and display carrier of FIG. 1.

Referring now also to FIG. 2, a button and display carrier 5 is integrally moulded in a uniform translucent plastics material. The carrier supports several of the buttons 30–36, and also supports the display 7, and is held by self tapping screws 23 to the inside back surface of the bezel 1. The carrier 5 has a generally rectangular form with a central display backlight portion 2 and two button portions 4,6 arranged on opposite sides of the display portion 2. The carrier has three clips 9,11,13 extending forwards of the carrier and to which the display 7 mounted.

The carrier is integrally moulded in a white translucent plastics polycarbonate material, sold by GE Plastics under the trade mark Lexan 123R.

Figure 3:
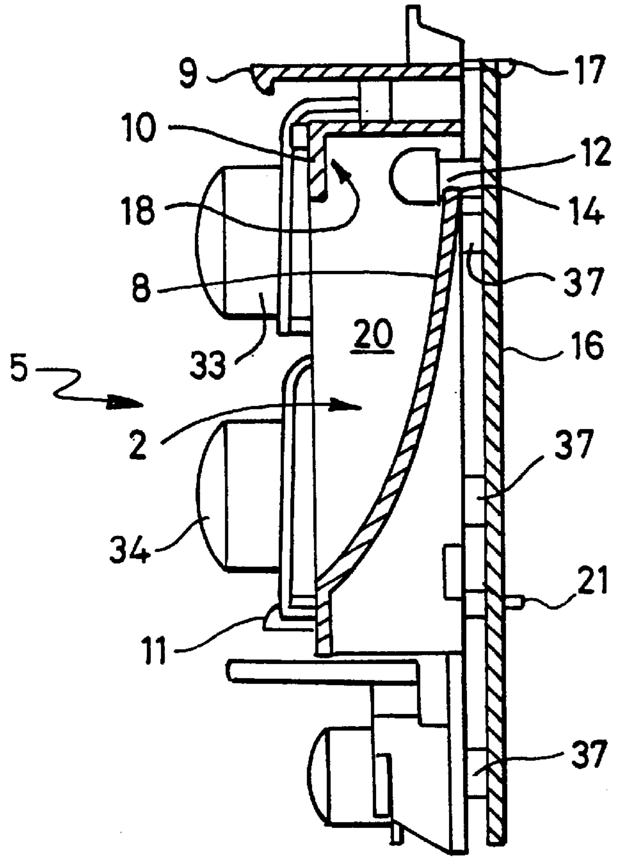
FIG. 3 is a cross-section view through the button carrier of FIG. 2, taken through line III—III showing the display backlight illumination.

With reference now also to FIG. 3, the display portion 2 has a rectangular and concave backlight area 8 for back illuminating the display 7, disposed generally behind and below a pelmet 10 that extends across the upper edge of the display portion. Six blue-green light emitting diodes (LEDs) 12 are equally spaced behind the length of the pelmet 10, along a top edge 14 of the backlight area 8. Each display LED 12 is mounted on a single circuit board 16 that is clipped by clips 17,19 and a locating stud 21 to the back of the carrier 5, with each display LED 12 resting in a shallow locating feature 60 on the backlight area top edge 14.

The light from the LEDs 12 is therefore directed generally downwards onto the backlight area 8, either directly or by surface-scattering from the surfaces 18 inside the pelmet 10. The uppermost part of the backlight area 8 is essentially perpendicular to the axis of the display LEDs 12, and farther away from the LEDs curves forwards towards the front of the carrier 5. The curving surface of the backlight area 8 faces generally in a direction towards the display 7. The curve is in the plane of FIG. 2 and has a parabolic shape so that areas further from the display LEDs 12 receive more incident light than, would otherwise be the case. This helps to provide a more even back illumination of the display 7.

At the sides of the backlight area, the display portion has end portions 20,22 that scatter incident light back towards the backlight area 8 and the display 7, so improving the evenness of the illumination.

In an alternative embodiment of the invention not illustrated in the drawings, a number of LEDs are arranged behind the backlight area to shine through the translucent material. However, such an arrangement requires more LEDs than the illustrated embodiment in order to achieve the same level of illumination, owing to back-scattering of light in a direction away from the display 7 and increased absorption of light in transmission through the translucent material.

Figure 4:
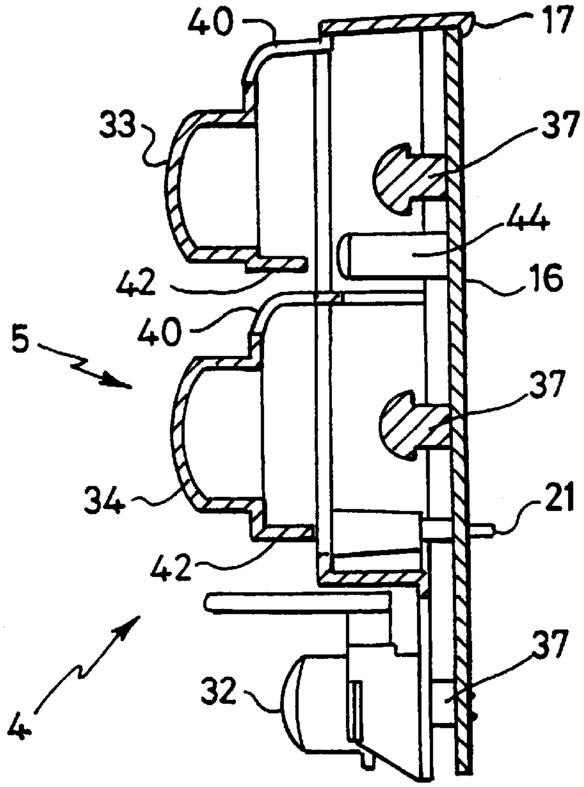
FIG. 4 is a cross-section view through the button carrier of FIG. 2, taken through line IV—IV, showing the button backlight illumination.

The button portion 4 is shown in more detail in FIG. 4. The button portions 4,6 are formed from the same translucent polycarbonate material, but will in general, have front surfaces which have been partially covered in an opaque coating (not shown), so that each integrally moulded button 30–36 may display information regarding the function of the button when backlighted through the uncoated portions by button illumination LEDs 37 mounted on the circuit board 16.

Each button 30–36 has a convex shape that projects forwards through an aperture in the bezel fixed portion 3, and is linked to the rest of the carrier 5 by a flexible linkage 40 that extends generally perpendicularly with respect to the plane of the carrier 5, and allows the button to rotate about an axis that is generally in the plane of the carrier. The flexible linkage in the present example is a pair of hinges 40 integrally moulded with each of the buttons 30–36, and connecting opposite upper corners of a button with the rest of the carrier 5. When a user pushes one of the buttons 30–36 from its rest position, the lower portion of the button rotates inwards so that an inwardly directly finger 42 in the middle lower portion of the button can make contact with an electrical contact 44 on the circuit board 16. In this particular embodiment of the invention, the finger 42 has a travel of about 2 mm, and therefore it is necessary for the material of the carrier 5 to have sufficient flexibility and resiliency for the hinges 40 to flex and then spring back to the rest position.

It may, of course, be possible to use other type of switch mechanism in which a button is not integrally moulded with the rest of the carrier. In this case, areas of the integrally moulded carrier adjacent the button would have a backlight arranged to shine through the translucent material, and optionally could be partially covered in an opaque coating in order to present information to the user.

It is, however, preferred if at least one of the buttons is integrally moulded owing to the reduction in the number and cost of components and assembly steps in manufacture.

The button carrier 5 described in detail above may be adapted for use with any other type of electronic apparatus in which at least one button and a display are required, and in which illumination of the display and of the button or areas adjacent the button is desired. The use of a single integrally moulded carrier 5 with the correct optical properties to allow such illumination allows cost saving to be made in the manufacture of the carrier and other components associated with the carrier, such as a bezel and circuit board. Particularly in components destined for high volume production, such as a cassette radio for a motor vehicle, even a small cost reduction in each component can amount to a significant total saving.

What is claimed:

1. A button and display carrier (5) for cooperating with a panel member (3) having a display (7), the carrier comprising a button portion, (4,6) and a display portion (2) integrally moulded in a translucent plastics material, the button portion (4,6) having at least one backlight (37) arranged to shine through the translucent material, and the display portion (2) having at least one display backlight (12) extending into the display portion (2) and arranged to illuminate a backlight area (8) of the translucent material, to provide a back illumination for the display (7), characterized in that the back illumination is provided both by light directly incident upon the backlight area (8) and surface-scattered from the backlight area (8).

2. The button and display carrier (5) of claim 1, in which the composition of the translucent material is substantially uniform in both the button and display portions (2,4,6).

3. The button and display carrier (5) of claim 1, in which the at least one display backlight (12) of the display portion (2) is disposed to one side of the backlight area (8), and illuminates most of the backlight area (8) at a shallow angle.

4. The button and display carrier (5) of claim 3, in which the display portion (2) has a linear array of display backlights (12) disposed along an edge (14) of the backlight area (8), a surface of the backlight area being concave in a plane perpendicular to the axis of the linear array of display backlights (12).

5. The button and display carrier (5) of claim 1, in which the button portion (4,6) has at least one button (30–36) integrally moulded with the carrier (5).

6. The button and display carrier (5) of claim 5, wherein the at least one button is attached to the carrier by a flexible linkage.

7. The button and display carrier (5) of claim 1, in which the at least one backlight (37) for the button portion (4,6) and the at least one display backlight (12) for the display portion (2) are mounted on a common circuit board (16) held to the carrier (5).

8. The button and display carrier (5) of claim 1, in which there are two button portions (4,6) arranged on opposite sides of the display portion (2).

9. The button and display carrier (5) of claim 1, in which the button portion (4,6) has an opaque surface coating over part of the translucent material, so that the button portion is backlit through the uncoated part.

10. A button and display carrier for mounting to a front panel member having a display, the carrier comprising a button portion and a display portion integrally moulded in a translucent plastics material, the button portion having at least one backlight arranged to shine through the translucent material for illuminating the button portion, and the display portion having a pelmet and a linear array of display backlights extending into the display portion and disposed behind the pelmet which are arranged to illuminate a backlight area of the translucent material, to provide a back illumination for the display, wherein a surface of the backlight area is concave from the front of the carrier, such that the back illumination includes light incident upon the surface of the backlight area and surface-scattered from the pelmet.

11. A button and display carrier for mounting to a bezel member having a display, the carrier comprising a button portion and a display portion integrally moulded in a translucent plastics material, the button portion having at least one backlight arranged to shine through the translucent material, and the display portion having at least one display backlight arranged to illuminate a backlight area of the translucent material for providing a diffuse back illumination for the display, the backlight area having a curved surface facing generally in a direction toward the display, the curved surface having a first edge and a second edge, the first edge of the curved surface disposed proximate the at least one display backlight in a plane perpendicular to the axis of the at least one display backlight and the second edge disposed proximate a front portion of the carrier, such that the diffuse back illumination includes light incident upon the curved surface of the backlight area and surface-scattered from the backlight area.

12. The button and display carrier of claim 9, wherein each of the display backlights has an axis perpendicular both to the front of the carrier and the pelmet.

* * * * *